June 23, 1931.  W. R. WOOD  1,811,658
STEAM GENERATION
Original Filed May 21, 1928    3 Sheets-Sheet 1

INVENTOR
Wilfred R. Wood
BY Synnestvedt + Lechner
ATTORNEYS

Patented June 23, 1931

1,811,658

UNITED STATES PATENT OFFICE

WILFRED R. WOOD, OF LONDON, ENGLAND, ASSIGNOR TO INTERNATIONAL COMBUSTION ENGINEERING CORPORATION, OF NEW YORK, N. Y., A CORPORATION OF DELAWARE

STEAM GENERATION

Application filed May 21, 1928, Serial No. 279,428. Renewed September 5, 1930.

This invention relates to steam generation and particularly to the generation of steam by an installation in which the combustion chamber is largely and preferably entirely defined by tubes subject to radiant heat.

The object of the invention is to provide an installation of this general nature characterized by having a number, and preferably all, of the following advantages:

A simple, strong, effective and inexpensive arrangement of parts giving relatively high capacity from a relatively small sized unit; the arrangement being one which may be, in general, followed in constructing boilers ranging widely in pressure.

Full utilization of the combustion space with efficient combustion and negligible loss in unconsumed combustible matter.

Low draft loss, low infiltration and relatively dry steam.

Comparative freedom from rapid clogging of the gas passages with ready accessibility for cleaning, inspection and repair, making it possible to hold the installation to uniform performance over long periods.

Ample circulation and flexibility over widely ranging rates of operation.

A relatively high degree of superheat from a relatively small amount of superheating surface rendering the installation capable of the development of high superheat compared to present practice, with high boiler pressures.

I obtain the foregoing, together with such other objects and advantages as may hereinafter appear, or are incident to my invention, by means of a construction which I have illustrated in the preferred form in the accompanying drawings, wherein—

Figure 1:
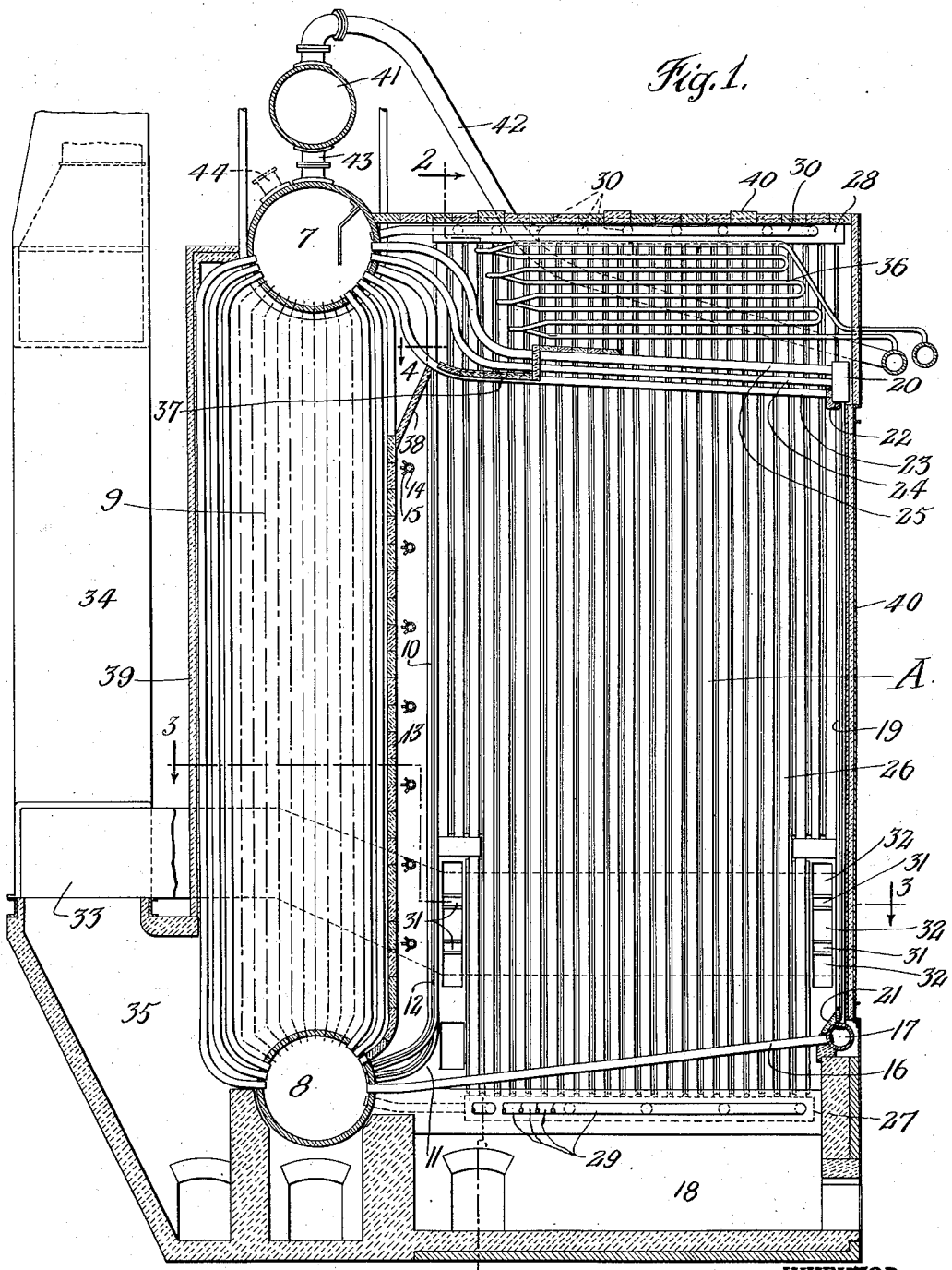
Fig. 1 is a vertical section through a unit embodying my invention.
Figure 2:
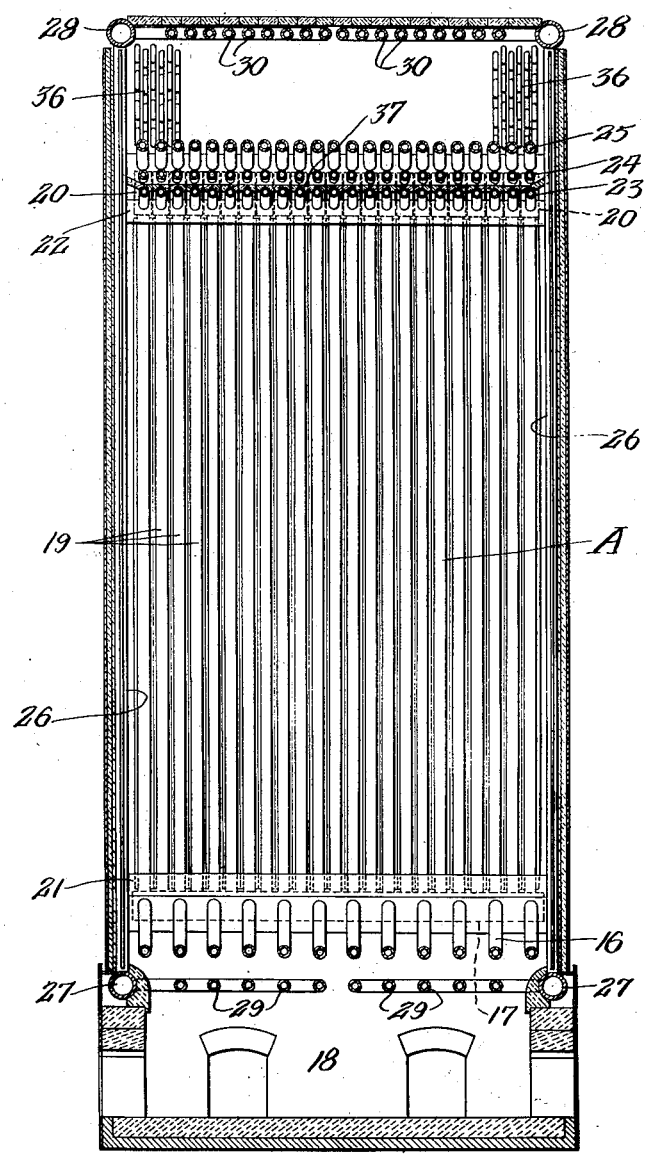
Fig. 2 is a section taken on the line 2—2 of Fig. 1.

Referring now particularly to Figs. 1 and 2, it will be seen that I provide a main upper drum 7 and a lower drum 8 connected by a vertical bank of tubes 9, in front of which is the combustion chamber A.

The rear of this combustion chamber is defined by a row of upright tubes 10 connected at their lower ends to the mud drum 8 and at their upper ends to the drum 7. The drum 8 being smaller than the drum 7, every alternate tube of the row of tubes 10 extends downward beyond the adjacent tubes, as indicated at 11, for connection to the drum 8 at a lower point, giving ample ligaments. The tubes 10 have longitudinally extending fins 12 extending from adjacent the drum 8 to a point short of the drum 7. The tubes and fins cooperate to form a metallic wall for the rear of the combustion space. This wall is spaced away from the front row of tubes of the bank of tubes 9, which row is provided with a baffle 13 extending from the mud drum 8 upwardly to a point short of the drum 7. In the space thus provided soot blower pipes 14 are located for blowing the bank of tubes 9. While, in the drawings, these blow-off pipes are shown as being spaced some distance from the baffle 13 for convenience of illustration, it is to be understood that they are preferably much more closely spaced so as to, in effect, block off the openings in the baffle 13 through which the nozzles 15 project. Relatively little leakage will thus occur through the rear wall 10 and the baffle 13 from the combustion space into the bank of tubes 9.

The bottom of the combustion space is defined by a row of tubes 16, which tubes incline upwardly and forwardly from the mud drum 8 to the small drum or header 17. These tubes are spaced sufficiently widely apart to permit of gravitating ash to freely pass through the spaces therebetween into the ash pit 18.

The front of the combustion space is defined by a row of upright finned tubes 19 connected at their lower ends into the header 17 and at their upper ends into the junction blocks or headers 20, the headers 17 and 20 being protected by refractory material 21 and 22 respectively.

Figure 4:
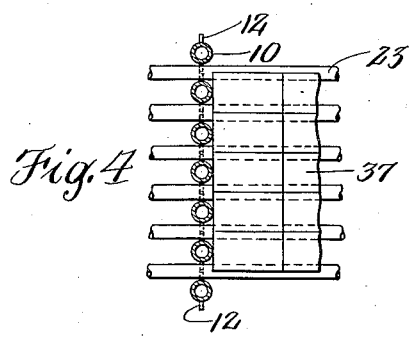
Fig. 4 is a fragmentary view illustrating a detail of the invention, and taken on the line 4—4 of Fig. 1, and Figs. 5, 6 and 7 are fragmentary views illustrating modifications of the invention.

The top of the combustion space is defined by rows of tubes connecting the headers 20 with the drum 7. The tubes of each row are given an ogee curve at their rear and upper ends for reasons which will appear hereinafter. The lower row of tubes 23 have their rear end portions passed through the spaces between the tubes 10 at a point where the fins 12 thereof terminate (see particularly Fig. 4). The middle row 24 of these tubes and the top row 25 bend upwardly in advance of the tubes 10 and connect to the drum 7 at points above the point of connection of the tubes 10 therewith. The row of tubes 25 is preferably larger than the other rows of these tubes.

Figure 3:
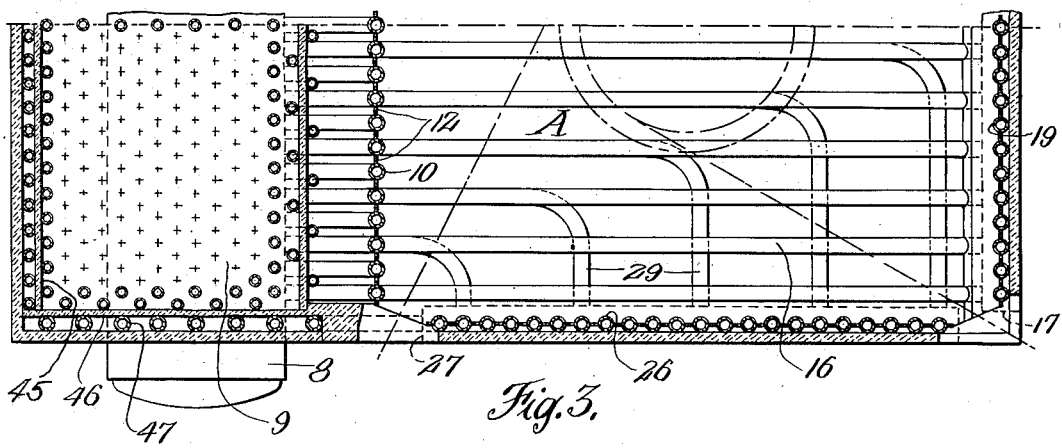
Fig. 3 is a half section taken on the line 3—3 of Fig. 1 and in part illustrating a modification of my invention.

Each side of the combustion space is defined by a row of finned tubes 26, the lower ends of which pass outwardly to the exterior for connection with a header 27 and the upper ends of which are connected with the header 28. The headers 27 are supplied from the mud drum 8 by a plurality of tubes 29 bent as shown in Fig. 3. Similarly shaped tubes 30 connect the headers 28 with the drum 7.

The circulation is as follows: From the mud drum through the tubes 16 to the header 17, through the tubes 19 to the headers 20, and thence through the tubes 23, 24 and 25 to the upper drum from the mud drum through the tubes 29 to the headers 27, and thence upwardly through the two sets of tubes 26 to the headers 28 and from thence through the tubes 30 to the upper drum 27; from the mud drum upwardly through the tubes 10 to the upper drum; from the upper drum to the lower drum through the bank of tubes 9. Thus, there is an upward circulation through all radiant heat tubes and a downward circulation through the convection bank of tubes 9, although, under certain conditions of operation, certain of the tubes of the bank of tubes 9 may have an upflow therein.

The fuel, preferably in finely divided form, as, for example, in the form of pulverized coal, is introduced into the lower part of the combustion space at the corners by burners 31, preferably arranged to direct the fuel streams tangent to a circle as indicated by the dot and dash lines in Fig. 3. Combustion air is led to the boxes 32 on opposite sides of the burners 31 by means of the conduits 33 leading from the air heater 34 located in the offtake 35. This combustion air is highly preheated. Owing to this manner of fuel and air admission, a vortical fuel and flame stream is produced with turbulent and intense combustion, giving a high furnace temperature head and securing a high rate of heat transfer through the tubes defining the combustion space. The full combustion space is utilized and combustion is efficiently completed before the tubes 23, 24 and 25 are reached, so that there is no substantial loss by virtue of combustible matter leaving the top of the combustion space. The updraft through the combustion space is counteracted by gravity so that the heavier particles of fuel remain sufficiently long in the combustion space to be consumed. At the same time the updraft prevents the gravitation of any appreciable quantity of combustible matter into the ash pit.

The gases passing over the tubes 23, 24 and 25 enter the space between such tubes and the tubes 30, this space being provided by virtue of the fact that the tubes 23, 24 and 25 for the greater portion of their length extend in a plane well below the plane of the drum 7.

In this space I locate the superheater 36 and the gases passing over the tubes 23, 24 and 25 are caused to pass over the tubes of the superheater by virtue of the baffle 37, this baffle being preferably composed of tiles carried on the tubes 23, 24 and 25, as shown. Tiles may be added to or taken from the baffle to cause a greater or shorter length of the superheater tubes to be effectively subjected to the gases, thus securing regulation of the degree of superheat. It is to be noted also that the superheater is located in advance of the convection bank 9 so that the superheater is subjected to high temperatured gases, the temperature of which is determined by the relatively small number of tubes comprising the rows of tubes 23, 24 and 25. The superheater being thus subjected to high temperatured gases, I am enabled to secure a relatively high degree of superheat from a relatively small superheater.

After passing over the superheater tubes, the gases pass over the tubes 25, 24, 10 and 23 in the order named, and thence into the convection bank, the space between the baffle 13 and the baffle 37 being bridged by the baffle 38. The flow of gases is down amongst the tubes of the bank 9 to the offtake 35, the sheathing 39 at the back of the bank serving as a baffle cooperating with the baffle 13 to give a single pass through the bank.

It will be seen that the arrangement is such that no gas passage is restricted, as would be the case, for example, were the tubes of the superheater nested amongst the tubes of the convection bank. Hence, the liability of "bird nesting" is reduced and, at the same time, the tubes 23, 24 and 25, the superheater tubes and the bank of tubes 9 can be readily cleaned. They are also readily accessible for inspection and repair.

Those skilled in the art will appreciate that draft loss is low, as is the amount of infiltration that can take place. In this connection it is understood that the top, sides and front of the unit are encased by suitable sheathing 40.

While the arrangement described is one which gives a large space for the superheater 36, it is also to be noted that ample ligaments are provided between all tubes connected into the drum 7. The foregoing is brought about by bending the tubes 23, 24 and 25 as described.

In view of the fact that the circulation through the radiant heat tubes will be very rapid, tending to produce turbulence in the drum 7, I provide a steam drum 41 thereabove, from which the steam is led to the superheater by the pipe 42. Connections 43 between the drum 7 and the drum 41 are provided in sufficient number and size to give low velocity of the steam passing from the drum 7 to the drum 41.

Feed water is supplied to the drum 7 by means of the feed water connection 44 indicated in dotted lines. The feed water connections may be located at any suitable point.

Ample circulation is secured without necessarily providing special downcomers, because there is a difference in pressure as between the drum 7 and the drum 8, and there is less weight of water and steam in the radiant heat tubes than there is weight of water in the convection bank 9.

The relation of radiant heat tubes and convection tubes is preferably such that at least half of the heat is absorbed by the radiant heat tubes.

If desired, a baffle 45 may be interposed between the next to the last rows of tubes of the convection bank, and baffles 46 may insulate the end rows of tubes of the convection bank, as indicated in Fig. 3, to shield such tubes from high heat. The end rows of tubes 47 of the bank may also be made larger than the remaining tubes of the convection bank, as shown in Fig. 3. This arrangement makes the shielded tubes more effective as downcomers.

Figure 5:
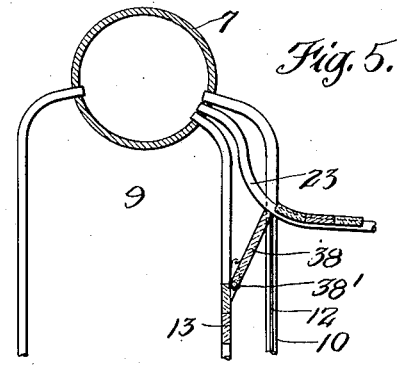

In addition to or substitution for the adjustability for different degrees of superheat herein described, the baffle 38 may be pivoted as indicated at 38' in Fig. 5. By opening this baffle more or less of the gases may be short-circuited.

Figure 6:
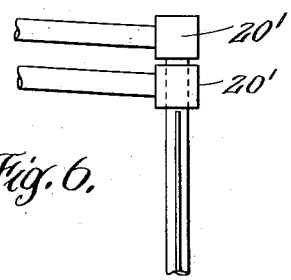
Figure 7:
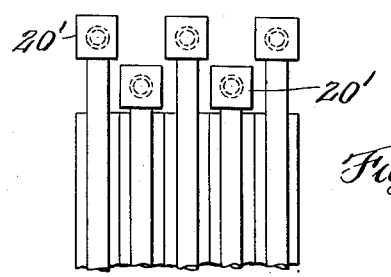

Individual headers 20' may be provided for the tubes 19 in the manner shown in Figs. 6 and 7.

Insofar as the tubes 16, 19 and 23, 24 and 25 are concerned, it will be seen that there are more tubes 19 than there are tubes 16, and that the tubes 23, 24 and 25 are greater in number than the tubes 19. This provides rapid circulation. In this connection it is also to be noted that the tubes 25 are preferably made of greater size than the tubes 23 and 24. The tubes 25 are the farthest from the source of high heat and, therefore, can carry a greater proportion of steam with safety.

The size and number of the tubes 29 and 30 are sufficient to provide adequate delivery to and from the side wall tubes.

While the tubes 23, 24 and 25 screen the superheater, they also screen the upper drum and the convection bank of tubes, the upper end portions of the tubes 10 also assisting in this latter connection. The gases, while leaving the top of the combustion space proper at relatively high temperatures, have a large amount of heat absorbed therefrom before they enter the single pass of the convection bank. The convection bank presents sufficient surface to lower the temperature of the gases to a point where sufficient heat may be abstracted therefrom in a commercially practical metallic air heater to reduce the final exit temperatures of the gases to an allowable value from the standpoint of economical operation. The heat abstracted by the air heater is returned into the combustion chamber with the combustion air to assist in securing efficient combustion of the character herein described.

It should be noted that the tubes 30, as well as the upper portions of the side wall tubes, abstract heat from the gases passing the tubes 23, 24 and 25 from the combustion space before the gases enter the convection bank.

I claim:

1. In combination, an upper and a lower drum, a bank of convection heat tubes connecting the same, a combustion chamber in front of the bank, a row of upright radiant heat tubes on each upright wall of the chamber, substantially horizontally disposed tubes connecting the upper ends of one of said rows with the upper drum and arranged below the top of the chamber to provide a space, a superheater in said space, and a baffle in the bank arranged so as to provide communication between said space and the bank, and communication between the said space and the combustion chamber proper being through spaces between said horizontal tubes.

2. In combination, an upper and a lower drum, a bank of convection heat tubes connecting the same, a combustion chamber in front of the bank, a row of upright radiant heat tubes on each upright wall of the chamber, substantially horizontally disposed tubes connecting the upper ends of one of said rows with the upper drum and arranged below the top of the chamber to provide a space, a superheater in said space, and a baffle in the bank arranged so as to provide communication between said space and the bank, and communication between the said space and the combustion chamber proper being through spaces between said horizontal tubes, together with means for admitting finely divided fuel into the lower part of the chamber.

3. In combination, an upper and a lower drum, a bank of convection heat tubes connecting the same, a combustion chamber in front of the bank, a row of upright radiant heat tubes on each upright wall of the chamber, substantially horizontally disposed tubes connecting the upper ends of one of said rows with the upper drum and arranged below the top of the chamber to provide a space, a superheater in said space, and a baffle in the bank arranged so as to provide communication between said space and the bank, and communication between the said space and the combustion chamber proper being through spaces between said horizontal tubes, the inner ends of the horizontal tubes being bent upwardly whereby the gases leaving said space are caused to pass thereover prior to entering the bank.

4. In combination, an upper and a lower drum, a bank of convection heat tubes connecting the same, a combustion chamber in front of the bank, a row of upright radiant heat tubes on each upright wall of the chamber, substantially horizontally disposed tubes connecting the upper ends of one of said rows with the upper drum and arranged below the top of the chamber to provide a space, a superheater in said space, and a baffle in the bank arranged so as to provide communication between said space and the bank, and communication between the said space and the combustion chamber proper being through spaces between said horizontal tubes, and a steam drum located above the upper drum and communicating therewith.

5. In combination, an upper and a lower drum, tubes connecting the same, a combustion chamber in front of the said tubes, a row of upright radiant heat tubes on each upright wall of the chamber, substantially horizontally disposed tubes connecting the upper ends of one of said rows with the upper drum and arranged below the top of the chamber to provide a space, a superheater in said space, communication between the said space and the combustion chamber proper being thru spaces between said horizontal tubes, and said space being largely defined by tubes.

In testimony whereof I have hereunto signed my name.

WILFRED R. WOOD.